Feb. 7, 1939. A. L. NILSSON 2,145,947
BROACH
Filed Jan. 30, 1937  2 Sheets-Sheet 1
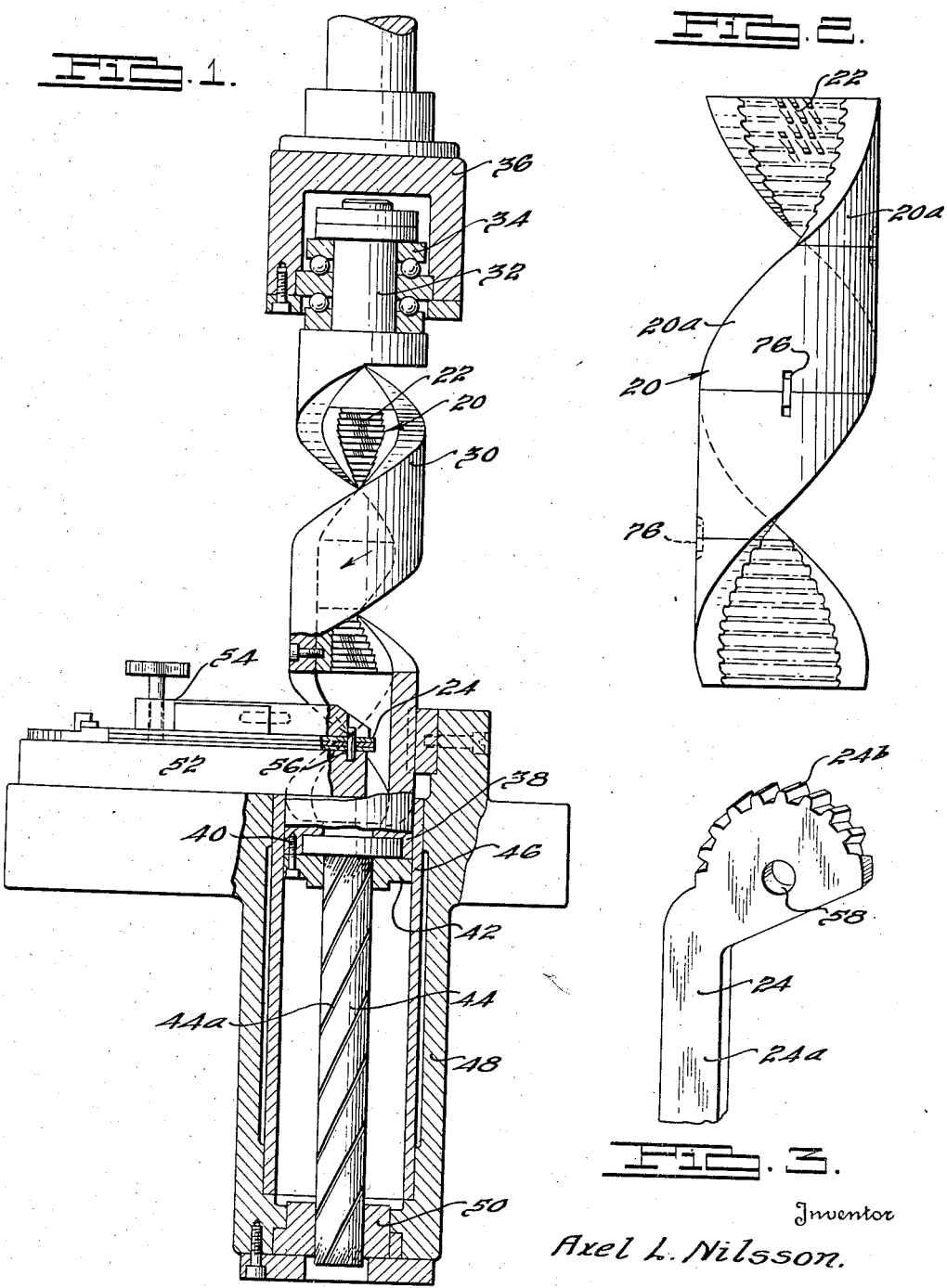
Inventor
Axel L. Nilsson.
By Harness, Dickey, Pierce & Hann.
Attorneys.

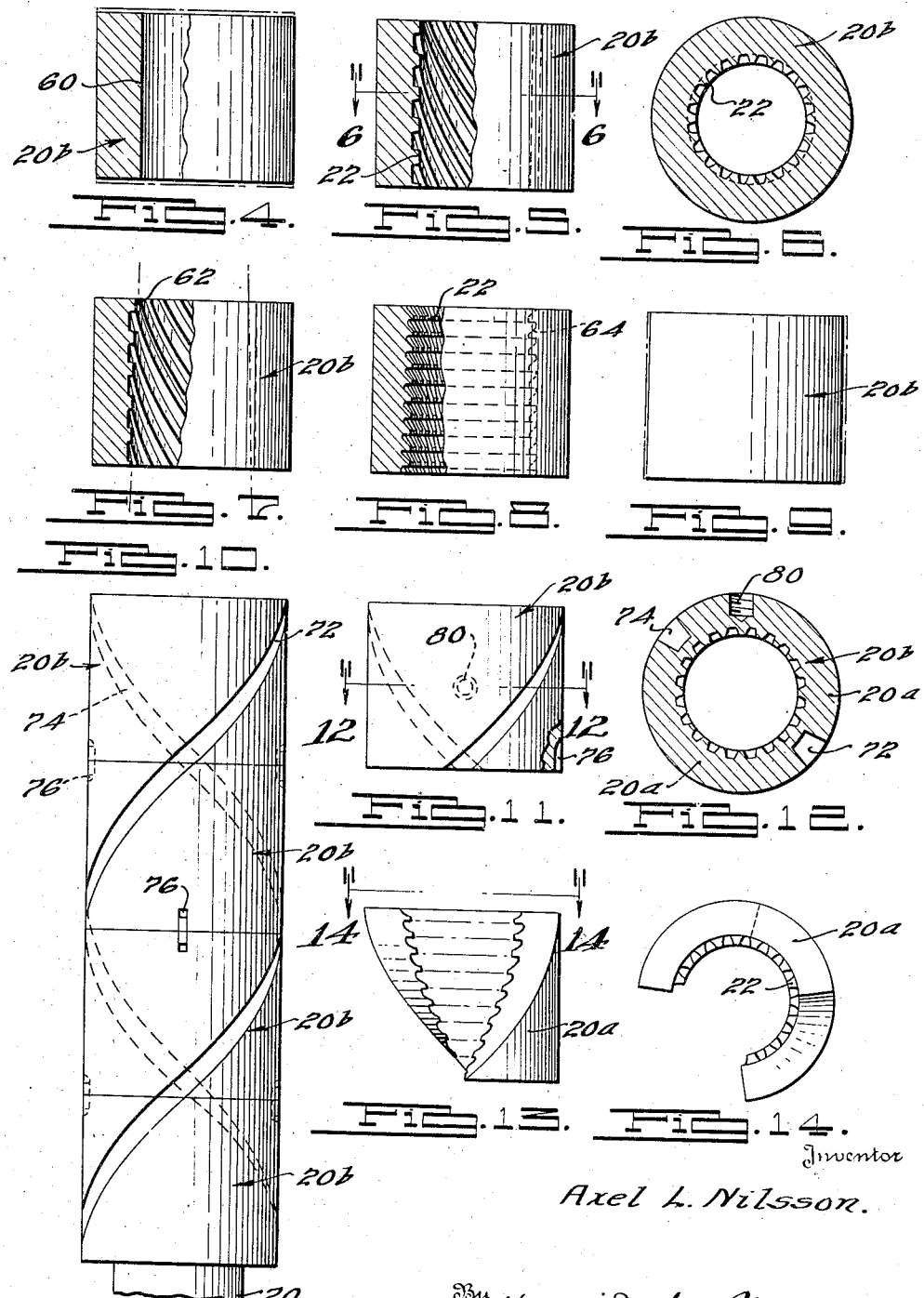

Patented Feb. 7, 1939

2,145,947

UNITED STATES PATENT OFFICE 2,145,947

BROACH

Axel L. Nilsson, Pleasant Ridge, Mich., assignor to Colonial Broach Company, Detroit, Mich., a corporation of Michigan Application January 30, 1937, Serial No. 123,168

10 Claims. (Cl. 29—35.1)

The present invention relates to broaches, and in particular provides an improved broach adapted to form one or more helical serrations on the surface of a work piece.

It has heretofore been proposed to utilize broaches and broaching machines to form helical serrations on the outer periphery of a work piece to form, for example, external helical gears or gear segments. Conventionally, a closed broach body is utilized, having inner helically disposed teeth around all or a portion of the inner periphery thereof, depending upon whether the serrations or teeth are to extend entirely around the periphery of the work piece or around only a predetermined segment or portion thereof. Alternatively, and in accordance with the improvements proposed in the co-pending application of William A. Hart, Serial No. 111,000, filed November 16, 1936, and assigned to the assignee of the present application, the broach is formed as a plurality of segments, each of which segments is effective to form the serrations or teeth in a predetermined portion of the periphery of the work piece. The respective segments are preferably disposed in axially displaced relation, in order to afford free access to the interior of the broach for chip clearance and the like. The axial movement of the work piece relative to the broach is accompanied by a relative rotation between the members, the degree of which corresponds to the desired helix angle of the serrations or teeth.

As will be appreciated, the heretofore proposed method of broaching helical serrations on the external periphery of a work piece are practical only in connection with work pieces which can be passed axially through the broach body; that is, work pieces having an external periphery which adapts them to be bodily passed through the broach. This limitation has prevented the extension of broaching to the manufacture of devices such as a crank arm having a helical gear segment formed at one end thereof.

In accordance with the present invention, the just mentioned limitation is entirely overcome, and the field for broaching correspondingly widened by forming the broach body in the form of an open helix, the angle of which corresponds to the desired helix angle of the broach teeth and positioning the broach teeth on the inner surface of this open helix. With this arrangement, the open helix of the broach accommodates the projecting part of the work piece, such as the arm of the just mentioned crank, and permits the toothed portion of the work piece to be serrated or provided with helical teeth to be readily presented to the broach teeth. The broaching operation may thus consist in moving the work piece axially of the broach and in relatively rotating the work piece and broach about the axis of the broach. Claims to the improved method of broaching, as well as to an improved machine for practicing the method, are presented in applicant's co-pending application, Serial No. 123,169, filed January 30, 1937, and assigned to the same assignee as the present application, and the present application is directed particularly to the improved broach.

With the foregoing consideration in mind, objects of the present invention are to provide an improved broach having a body formed as an open helix, and having broach teeth formed on the inner surface thereof; to provide such a broach in which the helix angle of the broach body corresponds to the helix angle of the broach teeth; and to provide such a broach in which the broach body is formed of a plurality of separate elements disposed in axially successive relation, and are retained within a holder constructed in the form of an open helix.

Further generic, as well as more detailed, objects relating to the structure, appear in the following detailed description, and in the claims.

In the drawings, which illustrate a preferred embodiment of the invention, and throughout which corresponding reference characters are used to designate corresponding parts;

Figure 1 is a fragmentary view in elevation, with certain of the parts shown in section, and based upon the disclosure of applicant's above identified co-pending application, Serial No. 123,169, showing the relation of the improved broach to the machine and to the work piece to be broached;

Fig. 2 is a detail view showing the improved broach;

Fig. 3 is a detail view of an illustrative work piece which may be broached by the improved broach of the present invention; and, Figs. 4 through 14 are views illustrative of the successive steps preferably followed in forming the broach of Fig. 2, Fig. 6 being a view in horizontal section taken along the line 6—6 of Fig. 5, Fig. 12 being a view in horizontal section taken along the line 12—12 of Fig. 11, and Fig. 14 being a plan view taken along the line 14—14 of Fig. 13.

Referring first to Figs. 1, 2 and 3, the broach 20 is shown as made up of a plurality of similar helical sections 20a, and provided on the inner surfaces with a plurality of rows of broach teeth 22, the height of which progressively increases from one end of the broach to the other, and which are disposed on a helix angle corresponding to the helix angle of the serrations or teeth to be formed in the work piece 24. The form of the broach teeth 22 is, of course, determined by the form of the serrations or teeth to be formed in the work piece, and the number of rows of teeth of course corresponds to and is determined by the number of serrations or teeth to be formed. In the illustrated instances, the work piece 24 is an element adapted to be used as a part of the window regulating mechanism of a vehicle, and includes a crank arm portion 24a provided at one end thereof, and a gear segment having the helical teeth 24b.

The complete broach 20, made up of the sections 20a, as hereinafter described, is assembled within a holder or outer body 30, formed as an open helix of an angle corresponding to that of the individual sections 20a and to the helix angle of the broach teeth 22. The upper end of the body 30, as viewed in Fig. 1, is formed as a trunnion 32, rotatably journaled between thrust roller bearing units 34 within the head 36 of the broaching machine. As described in more detail in applicant's above identified co-pending application, Serial No. 123,169, the head 36 is provided with suitable mechanism by which the broach 20 may be caused to move axially downwardly as viewed in Fig. 1. In order to cause the broach 20 to rotate relative to the work piece 24 during the axial movement of the former, the lower end 38 of the holder 30 is non-rotatably secured as by one or more studs 40 to a driving collar 42. The collar 42 has one or more internal threads which mate with and drivingly connect the collar 42 to a spiral lead screw 44. The outer surface of the body 30 is formed to be slidably received in a tubular portion 46 of the machine frame 48, which accordingly acts to guide the body 30 during its downward movement relative to the work. The machine frame 48 also is provided with a lower collar 50 within which the lower end of the lead screw 44 is non-rotatably secured. The lead of the thread 44a of the lead screw 44 corresponds, as will be appreciated, to the lead of the broach teeth 22, so that, as the broach 20 is moved downwardly by means of the broach head 36, it is axially rotated at a rate corresponding to the lead of the broach teeth 22.

The work pieces 24, three of which are shown in Fig. 1, in superposed and angularly offset relation to each other, are stationarily supported upon a work table 52 suitably secured to or forming part of the machine frame. The work pieces are retained in place thereon with the segmental periphral portions thereof presented to the broach teeth 22, and in overhanging relation to the work table 52, by means of a suitable clamping device 54, and an aligning pin 56, which passes through an axial bore 58 associated with each segmental portion. The pin 56 is received in a corresponding opening provided therefor in the work table 52. The crank or arm portion 24a of each work piece 24 is accommodated by the open helix formation of the broach 20 and the holder 30 so that, as will be appreciated, the form or size of the portion 24a is substantially immaterial, the improved broach thus being applicable to the broaching of any work piece having a projecting portion too large to be accommodated in the body of an enclosed or conventional circular broach.

Referring now particularly to Figs. 4 through 14, the preferred method of manufacturing the previously described complete broach 20 and assembling it within the holder 30 may be described as follows. The initial preferred step consists in boring and grinding to accurate length a number of sections of tool steel, to give each thereof the form shown in Fig. 4, and designated 24b. The length of each individual section is determined, of course, by manufacturing convenience. The number of sections of course depends upon the total desired overall length of the broach. Preferably and for convenience, all of the sections are given the same uniform internal bore 60.

Referring particularly to Figs. 5 and 6, the just described preliminarily formed individual sections 24b are internally broached by a suitable helically formed external broach, to form the helically disposed broach teeth 22. Thereafter, as shown in Figs. 7 and 8, the internal bores of the respective sections 20b are tapered as indicated at 62, and the teeth 22 thereof are gashed as indicated at 64. The tapering of the internal bores, as well as the gashing of the teeth, may be effected in accordance with conventional practice, and it will be appreciated that the tapering of the individual bores is such that the broach teeth 22 progressively increase in height from the entering end of the initial section 20b to the discharge end of the final section. Following the tapering of the bores and the gashing of the teeth, the individual sections 20a may be subjected to a machining operation to reduce them to accurate outer diametral size, as is shown in Fig. 9.

Following the above described preliminary formation of the individual broach sections 20b, the entire series thereof are assembled together in proper rotative relation to each other upon a master lead bar 70 as shown in Fig. 10, which bar, as will be appreciated, is externally threaded to mate with the helical rows of broach teeth previously formed in the individual sections 20a. While maintained in the thus assembled form, and with the master lead bar 70 acting as an arbor, the parting slots 72 and 74 are milled in the outer surfaces of the successive sections. In addition, registering key slots 76 are milled in the successive sections to facilitate the subsequent aligning thereof within the holder 30 described with reference to Fig. 1. As will be appreciated from the foregoing description based upon Figs. 1, 2 and 3, it is immaterial, in the broader aspect of the invention, whether the slots 72 and 74 are of exact helical form, or are of offset form, the essential requirement being that the broach structure be given an open generally helical form, which open form is proportioned to accommodate the projecting portion of the work piece or work pieces. An exact helical form of slots 72 and 74 is preferred, however, as shown in Fig. 10, as well as in the remaining figures, in view of the comparative readiness with which this form of slot may be milled into the broach structure.

Following the preliminary milling of the slots 72 and 74 as just described, the individual sections 20a are again separated from each other, and at least one mounting hole such as 80 is drilled and tapped into each individual section, the mounting holes 80 are adapted to receive set screws by which the individual broach elements 20 are ultimately secured in the broach holder 30.

Thereafter, the individual broach elements 20b are hardened by any suitable process, and, as a preliminary to the final separating operation, the outer periphery of each element is machined to bring it into accurate concentric relation to the inner periphery thereof. The parting operation is shown in Figures 13 and 14 consists in completing the slots 72 and 74, as by a grinding operation, to sever each section 20b into two duplicate sections 20a. Following the separation of the individual sections, the teeth of each thereof may be finally sharpened, as will be appreciated.

The final step in the formation of the broach consists in assembling the individual broach sections 20a within the holder 30, and securing them in place by set screws, or the like, which pass through the back of the individual elements and project into the previously mentioned openings 80. In the assembled relation of the elements, the individual elements abut each other and thus give axial support to each other.

While a specific embodiment of the invention has been described, it will be appreciated that various modifications may be made in the form and arrangement of the elements of the broach, and that various changes may be made in the proposed method of forming the broach, all within the spirit and scope of the invention.

What I claim is:

1. A broach comprising a body of open generally helical form the successive turns whereof are spaced apart axially of the broach so as to permit a workpiece to be inserted radially into the broach body, and having one or more broach teeth provided on the inner surface of said body having a helix angle corresponding to the angle of said open helix.

2. A broach comprising a body of open generally helical form the successive turns whereof are spaced apart axially of the broach so as to permit a workpiece to be inserted radially into the broach body, and having one or more rows of broaching teeth provided on the inner surface thereof, said teeth progressively increasing in depth from one end of said broach to the other end thereof.

3. A broach comprising a plurality of broach sections arranged in end to end relation to constitute an open generally helical broach body the successive turns whereof are spaced apart axially of the broach so as to permit a workpiece to be inserted radially into the broach body, each of said sections having one or more rows of helically disposed teeth formed thereon.

4. A broach comprising a plurality of broach sections, each having one or more rows of helically disposed teeth formed thereon, and means supporting said sections in axially successive relation to provide an open generally helical broach structure the successive turns whereof are spaced apart axially of the broach so as to permit a workpiece to be inserted radially into the broach body.

5. A broach comprising a plurality of broach sections, each having one or more rows of helically disposed teeth formed thereon, and means including a body for supporting said sections in axially successive relation, said body being of open generally helical form the successive turns whereof are spaced apart axially of the broach so as to permit a workpiece to be inserted radially into the broach body.

6. A broach comprising a plurality of broach sections, each having one or more rows of helically disposed teeth formed thereon, and means including a body for supporting said sections in axially abutting relation to each other, said body being of open generally helical form the successive turns whereof are spaced apart axially of the broach so as to permit a workpiece to be inserted radially into the broach body.

7. A broach having a body of strip-like form wound in open generally helical formation with the successive turns spaced apart axially, said body having a plurality of cutting teeth formed thereon.

8. A broach having a body of strip-like form wound in open generally helical formation with the successive turns spaced apart axially, said body having a plurality of cutting teeth formed thereon disposed on a helix corresponding generally to the helix angle of said body.

9. A broach having a body of strip-like form wound in open generally helical formation with the successive turns spaced apart axially, said body having a plurality of helically arranged cutting teeth on the inner surface thereof.

10. A broach having a body of strip-like form constituted by a plurality of sections connected together in end to end relation and wound in open generally helical formation with the successive turns spaced apart axially, said body having a plurality of cutting teeth formed thereon.

AXEL L. NILSSON.